(12) United States Patent
Shiau et al.

(10) Patent No.: US 7,740,393 B2
(45) Date of Patent: Jun. 22, 2010

(54) LIGHT GUIDE PLATE AND BACKLIGHT MODULE

(75) Inventors: Tzeng-Ke Shiau, Hsinchu (TW);
Ching-Shiang Li, Hsinchu (TW);
Chao-Hung Weng, Hsinchu (TW);
Jiun-Chian Liao, Hsinchu (TW);
Chih-Jen Tsang, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 11 days.

(21) Appl. No.: 12/021,257

(22) Filed: Jan. 28, 2008

(65) Prior Publication Data

US 2009/0040784 A1   Feb. 12, 2009

(30) Foreign Application Priority Data

Aug. 9, 2007   (TW) .............................. 96129383 A (51) Int. Cl.
*F21V 7/04*   (2006.01)
(52) U.S. Cl. ......................................... 362/626; 349/65
(58) Field of Classification Search ................ 362/326, 362/330–332, 336, 337, 561, 608, 610–615, 362/623, 625, 626, 800, 812; 349/57, 61–66
See application file for complete search history.

(56) References Cited

U.S. PATENT DOCUMENTS 5,390,085 A     2/1995   Mari-Roca et al.
6,123,431 A *   9/2000   Teragaki et al. ............. 362/625
6,147,725 A    11/2000   Yuuki et al.
6,629,764 B1 * 10/2003   Uehara ........................ 362/609
6,738,118 B2 *  5/2004   Hwang et al. ................ 349/119
6,835,440 B1 * 12/2004   Konishi et al. .............. 428/156
2002/0056355 A1   5/2002   Yoo
2006/0291253 A1  12/2006   Kim et al.

FOREIGN PATENT DOCUMENTS

CN      1769971      5/2006
TW     200705043     2/2007

\* cited by examiner

*Primary Examiner*—Hargobind S Sawhney
(74) *Attorney, Agent, or Firm*—Jianq Chyun IP Office (57) ABSTRACT

A light guide plate (LGP) adapted to a backlight module having a light emitting surface, a bottom surface opposite to the light emitting surface, and at least one light incident surface contacting with the light emitting surface and the bottom surface is provided. The bottom surface has a plurality of flat surfaces and a plurality of groove groups. The groove groups and the flat surfaces are arranged in an alternating fashion. Each of the groove groups has at least two grooves. Each of the grooves has a first slanted surface, a peak, and a second slanted surface intersecting with the first slanted surface at the peak. In each of the grooves, a first edge side of the first slanted surface away from the peak is at a first distance from a second edge side of the second slanted surface away from the peak.

15 Claims, 7 Drawing Sheets

LIGHT GUIDE PLATE AND BACKLIGHT MODULE

CROSS-REFERENCE TO RELATED APPLICATION

This application claims the priority benefit of Taiwan application serial no. 96129383, filed on Aug. 9, 2007. The entirety of the above-mentioned patent application is hereby incorporated by reference herein and made a part of this specification.

BACKGROUND OF THE INVENTION

1. Field of the Invention

The present invention relates to a backlight module. More particularly, the present invention relates to a light guide plate (LGP) applied to a backlight module.

2. Description of Related Art

Figure 1:
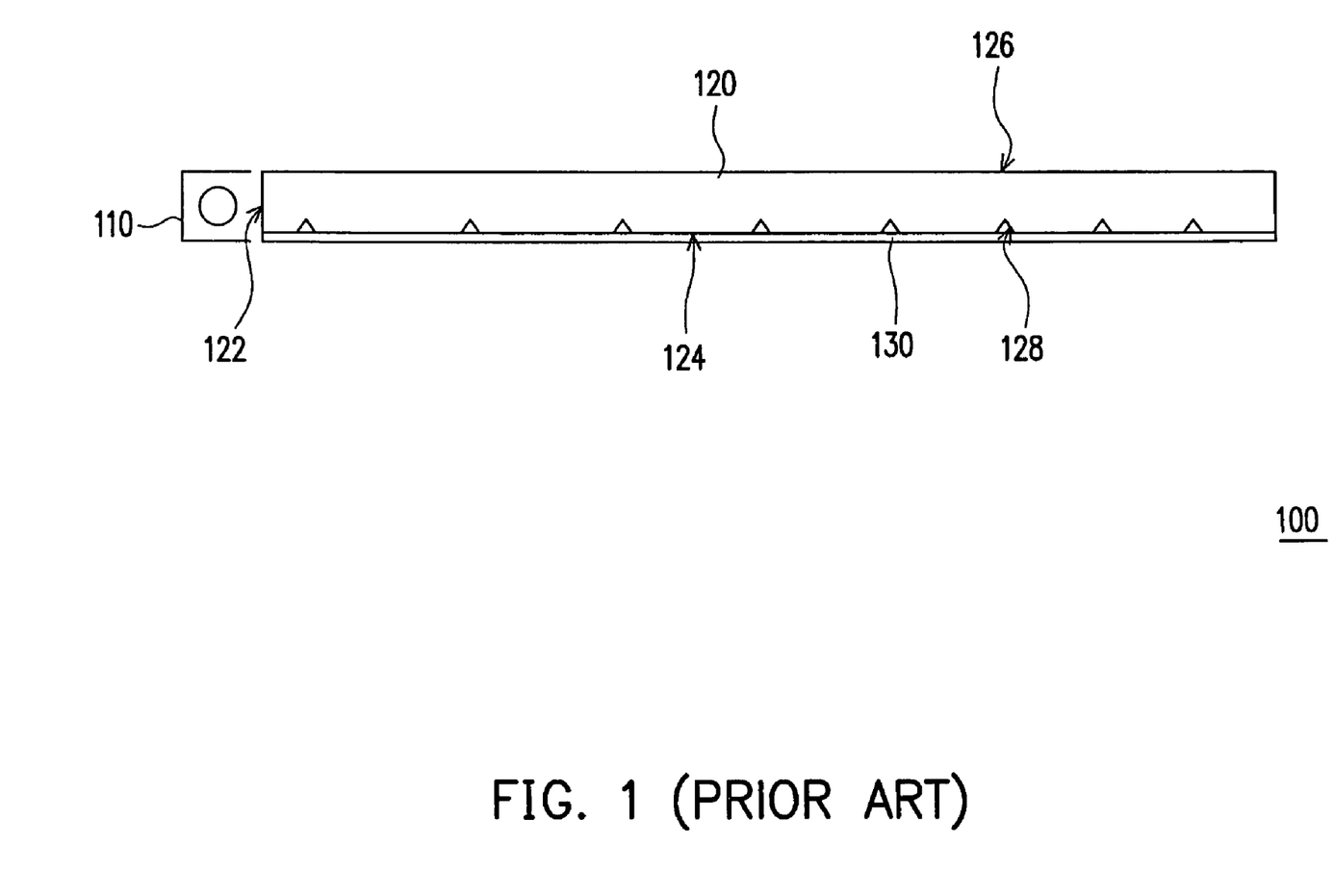
FIG. 1 is a schematic cross-sectional view of a conventional backlight module.
Figure 2:
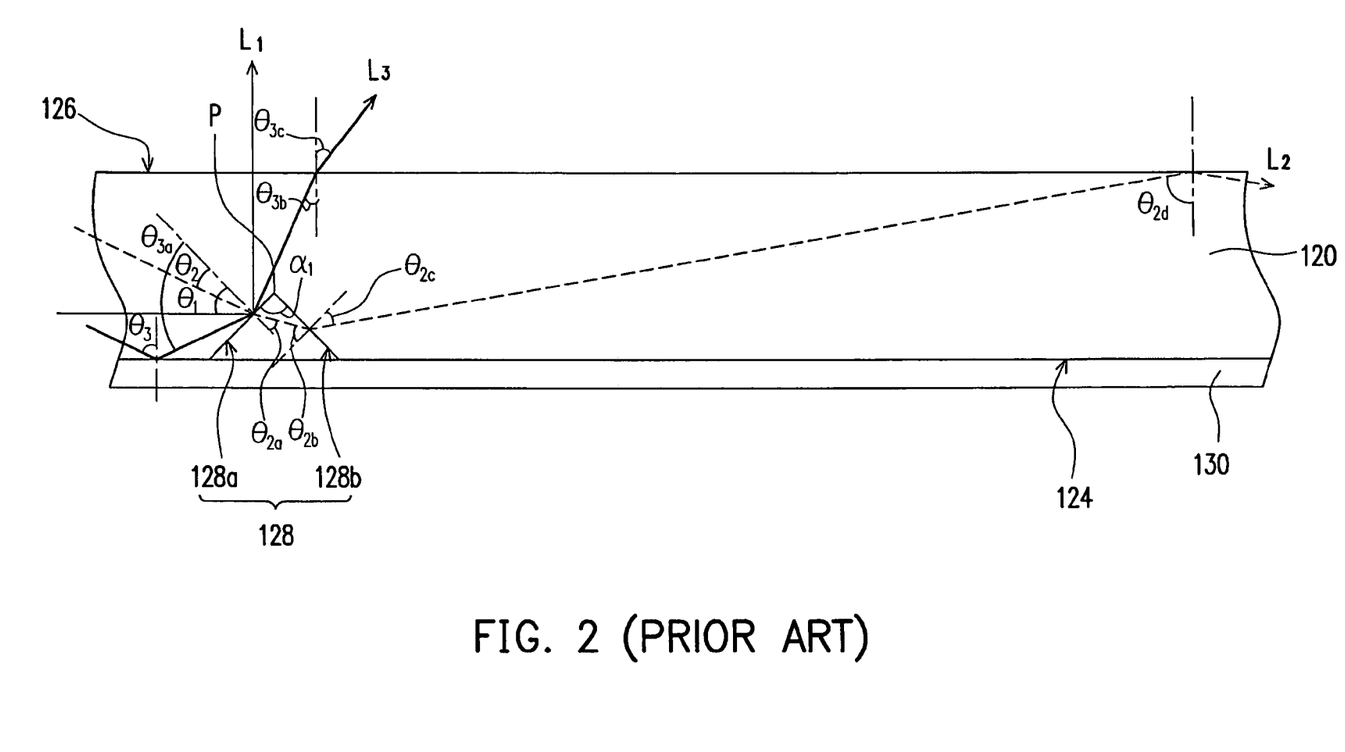
FIG. 2 is a schematic view of transmission paths of light in an LGP of FIG. 1.
Figure 3:
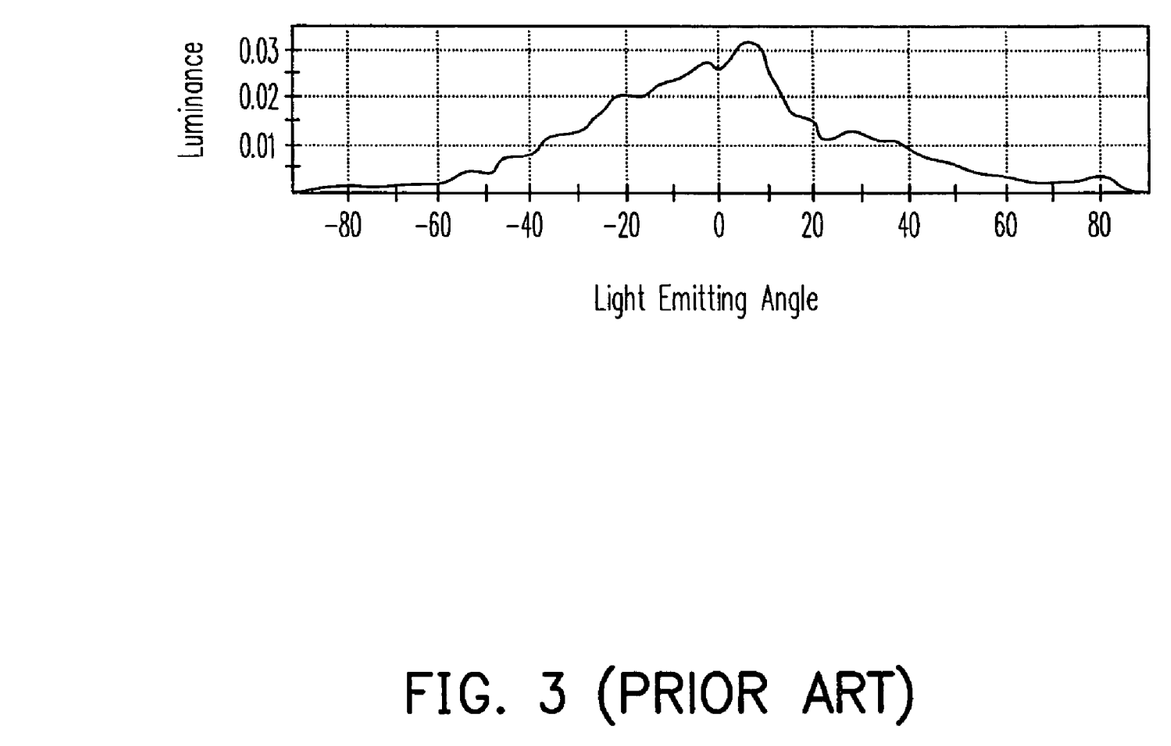
FIG. 3 is a diagram showing the relationship between a light emitting angle of the light emitting surface of the LGP of FIG. 1 and the luminance thereof.

FIG. 1 is a schematic cross-sectional view of a conventional backlight module, FIG. 2 is a schematic view of transmission paths of light in an LGP of FIG. 1, and FIG. 3 is a diagram showing the relationship between a light emitting angle of a light emitting surface of the LGP of FIG. 1 and the luminance thereof. Referring to FIG. 1, the backlight module 100 includes a light source 110, an LGP 120, and a reflective sheet 130. The light source 110 is disposed adjacent to a light incident surface 122 of the LGP 120, and the reflective sheet 130 is disposed on a bottom surface 124 of the LGP 120. The light provided by the light source 110 travels into the LGP 120 through the light incident surface 122, and travels out of the LGP 120 through a light emitting surface 126 of the LGP 120, so as to form a plane light source, and then travels to a liquid crystal display panel (LCD panel) (not shown) on the light emitting surface 126. The reflective sheet 130 may reflect the light to the light emitting surface 126. A plurality of grooves 128 on the bottom surface 124 of the LGP 120 may change the transmission paths of the light, so that the light travels to the light emitting surface 126 at a smaller incident angle. Therefore, the luminance efficiency of the LGP 120 is improved.

In detail, referring to FIG. 2, when a material of the LGP 120 is acrylic, a critical angle at which the light is totally reflected from the interface between the LGP and the air as the light is transmitted from the LGP to the air is about 42 degrees. For example, the section of each groove 128 is in V-shaped with two opposite sides equal in length and has a vertex angle $\alpha_1$ of 90 degrees. When the light $L_1$ travels to a slanted surface 128a of one of the grooves 128 at an incident angle $\theta_1$ of 45 degrees, the light $L_1$ is totally reflected at the slanted surface 128a of the groove 128. After that, the light $L_1$ travels to the light emitting surface 126 at an incident angle of 0 degree, and travels to the LCD panel through the light emitting surface 126.

Moreover, when the light $L_2$ travels to the slanted surface 128a of the groove 128 at an incident angle $\theta_2$ of 20 degrees, the light $L_2$ will be transmitted to the groove 128 through the slanted surface 128a of the groove 128. At this time, a refraction angle $\theta_{2a}$ of the light $L_2$ is about 30.7 degrees. Then, the light $L_2$ travels to another slanted surface 128b of the groove 128 at an incident angle $\theta_{2b}$ of 59.3 degrees, and passes through the slanted surface 128b of the groove 128 to be transmitted into the LGP 120. At this time, a refraction angle $\theta_{2c}$ of the light $L_2$ is about 35.1 degrees. After that, the light $L_2$ travels to the light emitting surface 126 at an incident angle $\theta_{2d}$ of 80.1 degrees, and is totally reflected at the light emitting surface 126.

In addition, when the light $L_3$ travels to the bottom surface 124 at an incident angle $\theta_3$ of 65 degrees, the light $L_3$ will be totally reflected at the bottom surface 124. Then, the light $L_3$ travels to the slanted surface 128a of the groove 128 at an incident angle $\theta_{3a}$ of 70 degrees, and is totally reflected at the slanted surface 128a of the groove 128. After that, the light $L_3$ travels to the light emitting surface 126 at an incident angle $\theta_{3b}$ of 25 degrees, and travels to the LCD panel through the light emitting surface 126. At this time, a refraction angle $\theta_{3c}$ of the light $L_3$ is about 39.2 degrees.

It should be noted that since the light $L_3$ passing through the light emitting surface 126 has a greater refraction angle $\theta_{3c}$, after the light provided by the light source 110 passes through the LGP 120 to form the plane light source, the concentration of the light is not satisfactory. Referring to FIG. 3, when the light provided by the light source 110 passes through the LGP 120 to form the plane light source, the half visual angles are within the range between −25.792 and 17.134 degrees. Here, each half visual angle is a light emitting angle corresponding to the luminance which is a half of the maximum luminance.

SUMMARY OF THE INVENTION

The present invention is directed to providing an LGP (light guide plate) and a backlight module using the LGP, so as to obtain better luminance efficiency after light passing through the LGP.

Other objectives and advantages of the present invention will be further understood with reference to technical features disclosed in the present invention.

In order to achieve the aforementioned and other advantages, an embodiment of the present invention provides an LGP adapted to a backlight module. The LGP has a light emitting surface, a bottom surface opposite to the light emitting surface, and at least one light incident surface contacting with the light emitting surface and the bottom surface. The bottom surface includes a plurality of flat surfaces and a plurality of groove groups. The groove groups and the flat surfaces are arranged in an alternating fashion. Each of the groove groups has at least two grooves. Each of the grooves has a first slanted surface, a peak, and a second slanted surface intersecting with the first slanted surface at the peak. In each of the grooves, a first edge side of the first slanted surface away from the peak is at a first distance from a second edge side of the corresponding second slanted surface away from the peak.

In order to achieve the aforementioned and other advantages, the present invention further provides a backlight module, which includes the LGP and a light source. The light source is disposed adjacent to the light incident surface of the LGP.

The LGP has a plurality of groove groups, and each of the groove groups has a plurality of grooves. Therefore, the LGP has better luminance efficiency, and the concentration of the light traveling out of the light emitting surface is satisfactory.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 4:
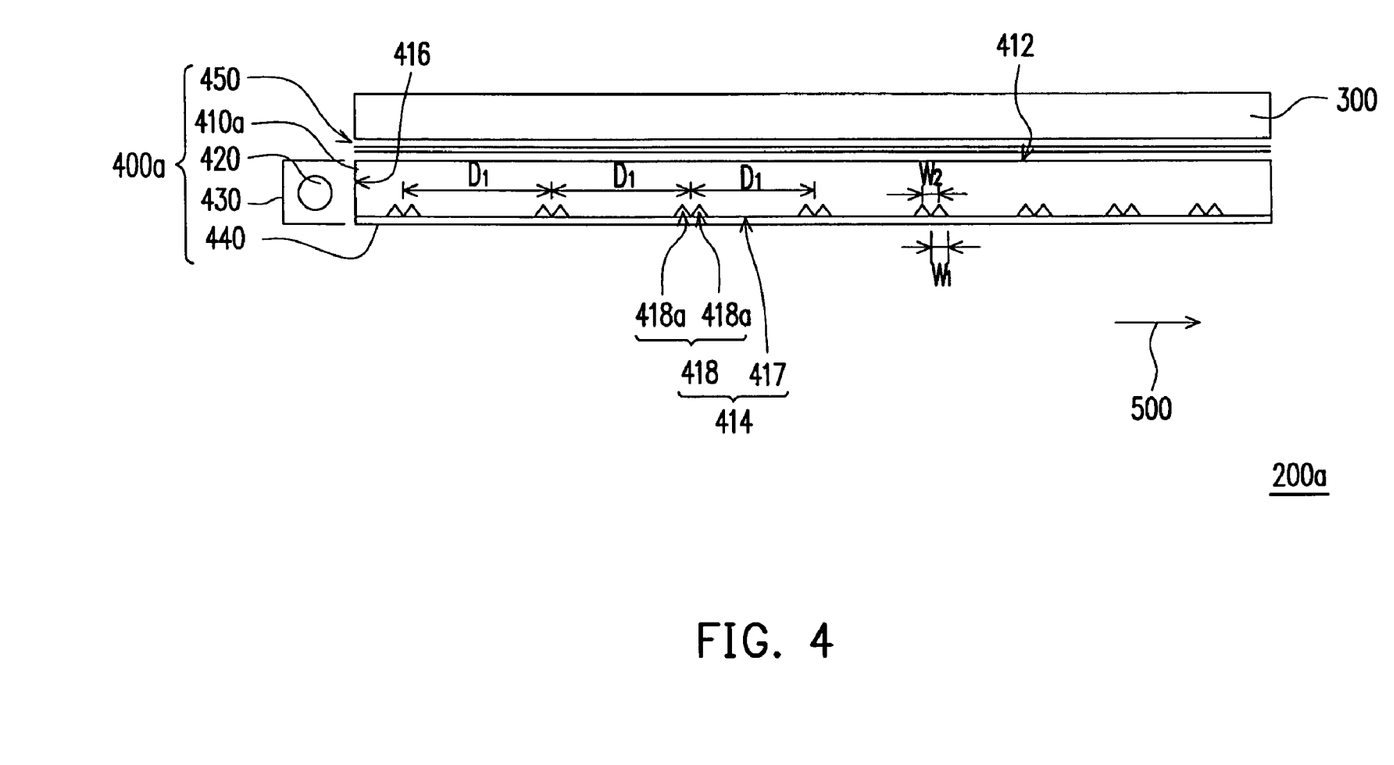
FIG. 4 is a schematic cross-sectional view of an LCD according to an embodiment of the present invention.
Figure 5:
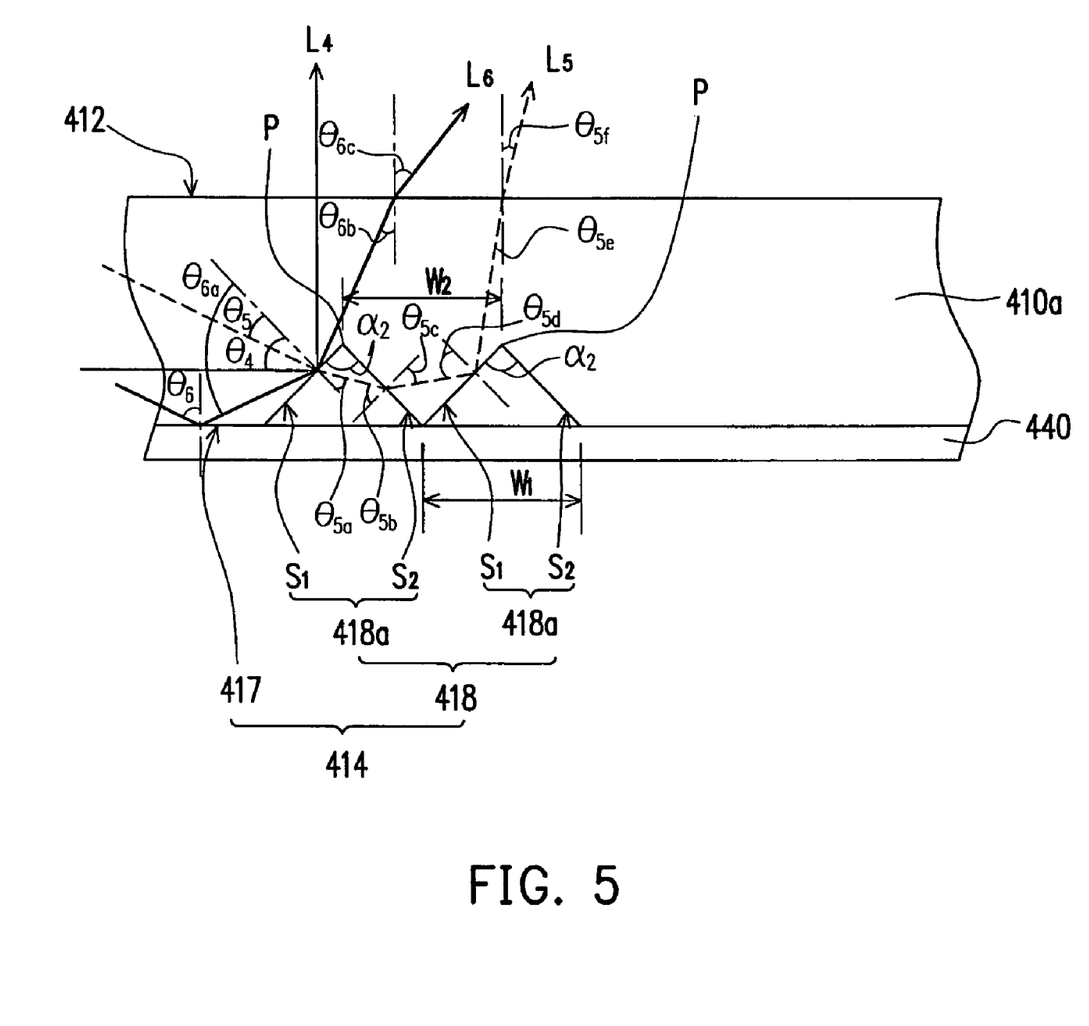
FIG. 5 is a schematic view of transmission paths of the light in the LGP of FIG. 4.
Figure 6:
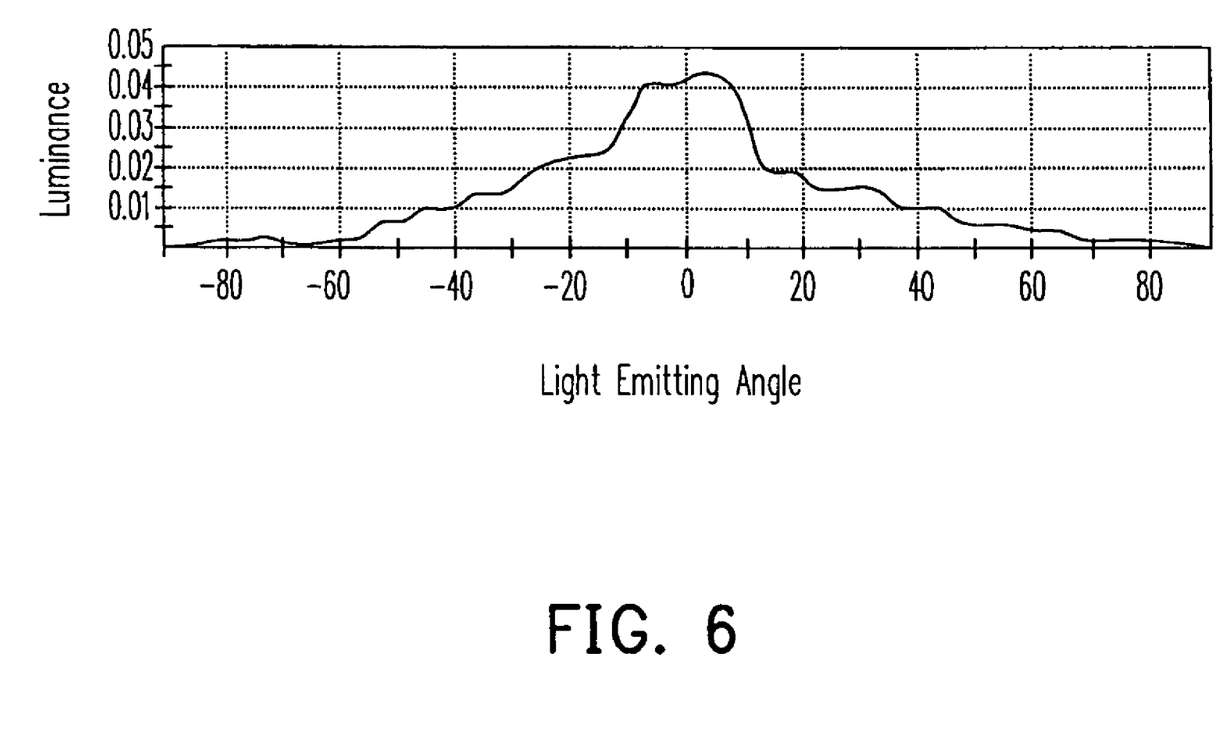
FIG. 6 is a diagram showing the relationship between a light emitting angle of the light emitting surface of the LGP of FIG. 4 and the luminance thereof.

FIG. 4 is a schematic cross-sectional view of an LCD according to an embodiment of the present invention, FIG. 5 is a schematic view of transmission paths of the light in the LGP of FIG. 4, and FIG. 6 is a diagram showing the relationship between a light emitting angle of the light emitting surface of the LGP of FIG. 4 and the luminance thereof. Referring to FIG. 4, the LCD 200a includes an LCD panel 300 and a backlight module 400a. The backlight module 400a is disposed on one side of the LCD panel 300, and includes an LGP 410a and a light source 420.

The LGP 410a, for example, is a flat-type LGP. The LGP 410a has a light emitting surface 412 facing the LCD panel 300, a bottom surface 414 opposite to the light emitting surface 412, and at least one light incident surface 416 contacting with the light emitting surface 412 and the bottom surface 414. In this embodiment, the LGP 410a, for example, has only one light incident surface 416. However, in other embodiments, the LGP 410a may include a plurality of light incident surfaces 416. The light source 420, for example, is a CCFL, and the light source 420 is disposed adjacent to the light incident surface 416 to provide light. The light provided by the light source 420 is adapted for traveling into the LGP 410a through the light incident surface 416, and traveling out of the LGP 410a through the light emitting surface 412, so as to form the plane light source required by the LCD panel 300.

In this embodiment, the backlight module 400a further includes a reflective cover 430, a reflective sheet 440, and an optical film set 450. The reflective cover 430 is disposed adjacent to the light incident surface 416, the light source 420 is disposed between the light incident surface 416 and the reflective cover 430, and the reflective sheet 440 is disposed on the bottom surface 414. The optical film set 450 is disposed on the light emitting surface 412 and between the LCD panel 300 and the LPG 410a. The optical film set 450 includes at least one of a diffusion plate, a prism plate, and a brightness enhanced film. The reflective cover 430 reflects the light provided by the light source 420 to the light incident surface 416, such that the light travels into the LGP 410a through the light incident surface 416. The reflective sheet 440 reflects the light traveling into the LGP 410a to the light emitting surface 412, such that the light travels out of the LGP 410a through the light emitting surface 412, so as to form the plane light source required by the LCD panel 300. The optical film set 450 uniforms the light provided by the plane light source and traveling out of the light emitting surface 412, and improves the luminance of the plane light source. The structure and features of the LGP 410a will be illustrated in detail below.

Referring to FIGS. 4 and 5, the bottom surface 414 of the LGP 410a includes a plurality of flat surfaces 417 and a plurality of groove groups 418. The groove groups 418 and the flat surfaces 417 are arranged in an alternating fashion. Every two neighboring groove groups 418, for example, are spaced apart with a pitch $D_1$. The pitches $D_1$ decrease gradually in a direction 500 away from the light incident surface 416. In other words, one of the pitches $D_1$ adjacent to the light incident surface 416 is greater than another one of the pitches $D_1$ away from the light incident surface 416.

Each of the groove groups 418 has at least two grooves 418a. Each of the grooves 418 has a first slanted surface $S_1$, a peak P, and a second slanted surface $S_2$ intersecting with the first slanted surface $S_1$ at the peak P. In other words, the section of each groove 418a of each groove group 418 is V-shaped. In each groove 418a, a first edge side of the first slanted surface $S_1$ is away from the peak P, and a second edge side of the second slanted surface $S_2$ is away from the peak P. The first edge side of the first slanted surface $S_1$ of each groove 418a is at a first distance $W_1$ from the second edge side of the corresponding second slanted surface $S_2$. The neighboring peaks P of each groove groups 418 are spaced apart with a second distance $W_2$. In this embodiment, the second distance $W_2$ minus the first distance $W_1$ equals to 0. In other words, the grooves 418a of the groove groups 418 are close to one another.

The transmission paths of the light in the LGP 410a will be illustrated below, in which only one of the groove groups 418 is taken as an example for illustration. In this embodiment, when the light entering the LGP 410a travels to the groove group 418, part of the light will pass through the first slanted surface $S_1$ and the second slanted surface $S_2$ of the left groove 418a to travel to the right groove 418a. After that, the light is totally reflected at the first slanted surface S1 of the right groove 418a to travel to the light emitting surface 412, so that the light passes through the light emitting surface 412 and travels to the LCD panel 300. Therefore, the LGP 410a of this embodiment has better luminance efficiency.

For example, when the material of the LGP 410a is acrylic, and the critical angle at which the light is totally reflected from the interface between the LGP and the air as the light is transmitted from the LGP to the air is about 42 degrees. The section of each groove 418a, for example, is a V-shaped with two opposite sides equal in length and has a vertex angle $\alpha_2$, the included angle between the first slanted surface $S_1$ and the second slanted surface $S_2$, of 90 degrees. When the light $L_4$ travels to the first slanted surface $S_1$ of the left groove 418a at an incident angle $\theta_4$ of 45 degrees, the light $L_4$ will be totally reflected at the first slanted surface $S_1$ of the left groove 418a. After that, the light $L_4$ travels to the light emitting surface 412 at an incident angle of 0 degree, and then passes through the light emitting surface 412 to travel to the LCD panel 300 (as shown in FIG. 4).

In addition, when a light $L_5$ travel to the first slanted surface $S_1$ of the left groove 418a at an incident angle $\theta_5$ of 20 degrees, the light $L_5$ passes through the first slanted surface $S_1$ to be transmitted into the left groove 418a. At this time, a refraction angle $\theta_{5a}$ of the light $L_5$ is about 30.7 degrees. Then, the light $L_5$ travels to the second slanted surface $S_2$ of the left groove 418a at an incident angle $\theta_{5b}$ of 59.3 degrees, and passes through the second slanted surface $S_2$ to be transmitted into the LGP 410a. At this time, a refraction angle $\theta_{5c}$ of the light $L_5$ is about 35.1 degrees. Then, the light $L_5$ travels to the first slanted surface $S_1$ of the right groove 418a at an incident angle $\theta_{5d}$ of 54.9 degrees, and is totally reflected at the first slanted surface $S_1$. After that, the light $L_5$ travels to the light emitting surface 412 at an incident angle $\theta_{5e}$ of 9.9 degrees, and passes through the light emitting surface 412 to travel to the LCD panel 300 (as shown in FIG. 4). At this time, a refraction angle $\theta_{5f}$ of the light $L_5$ is about 14.9 degrees.

In addition, when light $L_6$ is parallel to the light $L_5$, and travels to the bottom surface 414 at an incident angle $\theta_6$ of 65 degrees, the light $L_6$ is totally reflected at the bottom surface 414. Then, the light $L_6$ travels to the first slanted surface $S_1$ of the left groove 418a at an incident angle $\theta_{6a}$ of 70 degrees, and is totally reflected at the first slanted surface $S_1$ of the left groove 418a. After that, the light $L_6$ travels to the light emitting surface 412 at an incident angle $\theta_{6b}$ of 25 degrees, and passes through the light emitting surface 412 to travel to the LCD panel 300 (as shown in FIG. 4). At this time, a refraction angle $\theta_{6c}$ of the light $L_6$ is about 39.2 degrees.

Compared with the light $L_2$ of the prior art (see FIG. 2), in this embodiment, the light $L_5$ travels to the right groove 418a after passing through the left groove 418a, and is totally reflected at the first slanted surface $S_1$ of the right groove 418a to travel to the light emitting surface 412. Therefore, the LGP 410a of this embodiment has better luminance efficiency.

In addition, the refraction angle $\theta_{5f}$ at which the light $L_5$ passes through the light emitting surface 412 is smaller than the refraction angle $\theta_{6c}$ at which the light $L_6$ passes through the light emitting surface 412. The refraction angle $\theta_{6c}$ is the same as the refraction angle $\theta_{3c}$ at which the light $L_3$ passes through the light emitting surface 126 of the prior art (see FIG. 2). Therefore, after the light provided by the light source 420 passes through the LGP 410a to form the plane light source, the light is preferably concentrated. In other words, referring to FIG. 6, when the light provided by the light source 420 passes through the LGP 410a to form the plane light source, the half visual angles is further reduced to be within the range between −21.824 to 13.166 degrees.

However, the above embodiments are not intended to limit the present invention. For example, the vertex angle $\alpha_2$, the included angle between the first slanted surface $S_1$ and the second slanted angle $S_2$, of the groove 418a is not limited to 90 degrees, but can be preferably designed according to another material of the LGP 410a and other design conditions. Furthermore, the vertex angle $\alpha_2$ is preferably greater than or equal to 60 degrees and less than or equal to 120 degrees. Moreover, in other embodiments, each of the groove groups 418 may have three or more grooves 418a, and the grooves 418a of each groove group 418 may not be close to one another.

In addition, the light emitting surface 412 of the LGP 410a may have a plurality of microstructures and the section of each microstructure is in a shape of V, prism, trapezoid, or other polygons, such that the light provided by the light source 420 has higher luminance when passing through the LGP 410a to form the plane light source.

Figure 7:
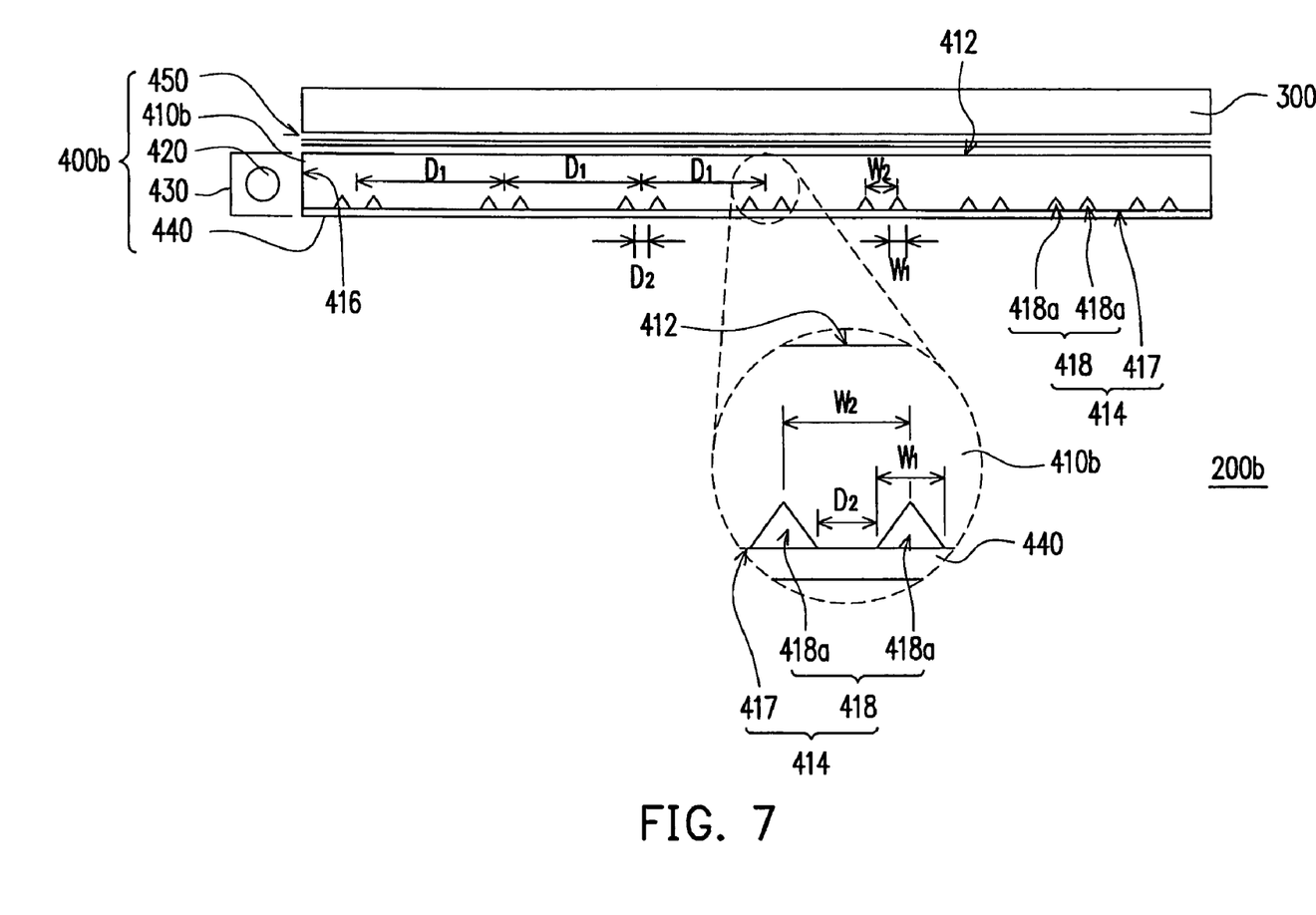
FIG. 7 is a schematic structural view of an LCD according to another embodiment of the present invention.

FIG. 7 is a schematic structural view of an LCD according to another embodiment of the present invention. Referring to FIG. 7, the structure of the LCD 200b is similar to that of the LCD 200a of FIG. 4, and the difference is described as follows. In the backlight module 400b of the LCD 200b, the grooves 418a of each groove group 418 of the LGP 410b are not close to one another.

In this embodiment, for example, the second distance $W_2$ minus the first distance $W_1$ is equal to a difference $D_2$. The specific value calculated by dividing the difference $D_2$ by the first distance $W_1$ is between 0 and 1, and preferably between 0 and 0.5.

To sum up, the LGP has a plurality of groove groups, and each of the groove groups has a plurality of grooves. Therefore, the LGP has good luminance efficiency, and the concentration of the light traveling out of the light emitting surface is better.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light guide plate, adapted to a backlight module and having a light emitting surface, a bottom surface opposite to the light emitting surface, and at least one light incident surface contacting with the light emitting surface and the bottom surface, wherein the bottom surface comprises:
   a plurality of flat surfaces; and
   a plurality of groove groups, wherein the flat surfaces and the groove groups are arranged alternately from a first end of the bottom surface contacting with the light incident surface to a second end of the bottom surface opposite to the first end of the bottom surface, each of the groove groups has at least two grooves, each of the grooves has a first slanted surface, a peak, and a second slanted surface intersecting with the first slanted surface at the peak, and in each of the grooves, a first edge side of the first slanted surface away from the peak is at a first distance from a second edge side of the corresponding second slanted surface away from the peak, wherein a second distance is between each two neighboring peaks of each groove group, each of the groove groups has a specific value calculated by dividing a difference of the second distance minus the first distance by the first distance, and each of the groove groups from the first end of the bottom surface to the second end of the bottom surface satisfies that the specific value is greater than 0 and smaller than 1.

2. The light guide plate as claimed in claim 1, wherein an included angle between the first slanted surface and the corresponding second slanted surface of each groove is greater than or equal to 60 degrees and smaller than or equal to 120 degrees.

3. The light guide plate as claimed in claim 1, wherein the specific value is greater than 0 and smaller than 0.5.

4. The light guide plate as claimed in claim 1, wherein each two neighboring groove groups are spaced apart with a pitch, and the pitches decrease gradually in a direction away from the light incident surface.

5. The light guide plate as claimed in claim 1 having a constant thickness along a direction perpendicular to the light emitting surface and the bottom surface.

6. A backlight module, comprising:
   a light guide plate, having a light emitting surface, a bottom surface opposite to the light emitting surface, and at least one light incident surface contacting with the light emitting surface and the bottom surface, wherein the bottom surface comprises:
      a plurality of flat surfaces; and
      a plurality of groove groups, wherein the flat surfaces and the groove groups are arranged alternately from a first end of the bottom surface contacting with the light incident surface to a second end of the bottom surface opposite to the first end of the bottom surface, each of the groove groups has at least two grooves, each of the grooves has a first slanted surface, a peak, and a second slanted surface intersecting with the first slanted surface at the peak, and in each of the grooves, a first edge side of the first slanted surface away from the peak is at a first distance from a second edge side of the second slanted surface away from the peak, wherein a second distance is between each two neighboring peaks of each groove group, each of the groove groups has a specific value calculated by dividing a difference of the second distance minus the first distance by the first distance, and each of the groove groups from the first end of the bottom surface to the second end of the bottom surface satisfies that the specific value is greater than 0 and smaller than 1; and
   a light source, disposed adjacent to the light incident surface.

7. The backlight module as claimed in claim 6, wherein an included angle between the first slanted surface and the corresponding second slanted surface of each groove is greater than or equal to 60 degrees and smaller than or equal to 120 degrees.

8. The backlight module as claimed in claim 6, wherein the specific value is greater than 0 and smaller than 0.5.

9. The backlight module as claimed in claim 6, wherein each two neighboring groove groups are spaced apart with a pitch, and the pitches decrease gradually in a direction away from the light incident surface.

10. The backlight module as claimed in claim 6, wherein the light guide plate has a constant thickness along a direction perpendicular to the light emitting surface and the bottom surface.

11. The backlight module as claimed in claim 6, wherein the light source comprises a cold cathode fluorescent lamp.

12. The backlight module as claimed in claim 6, further comprising an optical film set disposed on the light emitting surface.

13. The backlight module as claimed in claim 12, wherein the optical film set comprises at least one of a diffusion plate, a prism plate, and a brightness enhanced film.

14. The backlight module as claimed in claim 6, further comprising a reflective cover disposed adjacent to the light incident surface, wherein the light source is disposed between the light incident surface and the reflective cover.

15. The backlight module as claimed in claim 6, further comprising a reflective sheet disposed on the bottom surface.

* * * * *